US007315866B2

(12) United States Patent
Wu et al.

(10) Patent No.: US 7,315,866 B2
(45) Date of Patent: Jan. 1, 2008

(54) METHOD FOR INCREMENTAL AUTHENTICATION OF DOCUMENTS

(75) Inventors: Yong Dong Wu, Singapore (SG); Huijie Robert Deng, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 447 days.

(21) Appl. No.: 10/957,414

(22) Filed: Oct. 1, 2004

(65) Prior Publication Data

US 2005/0091261 A1  Apr. 28, 2005

Related U.S. Application Data

(60) Provisional application No. 60/508,234, filed on Oct. 2, 2003.

(51) Int. Cl.
*G06F 17/30* (2006.01)
*G06F 15/16* (2006.01)
(52) U.S. Cl. ............... 707/102; 707/100; 707/101; 713/176
(58) Field of Classification Search ............... 713/176; 711/134; 380/23, 51
See application file for complete search history.

(56) References Cited

U.S. PATENT DOCUMENTS

| 5,781,629 | A  | * | 7/1998  | Haber et al. ............... 713/177 |
| 5,898,779 | A  | * | 4/1999  | Squilla et al. ............... 713/176 |
| 5,912,974 | A  | * | 6/1999  | Holloway et al. ............ 380/51 |
| 6,111,953 | A  | * | 8/2000  | Walker et al. ............... 380/51 |
| 6,834,329 | B2 | * | 12/2004 | Sasaki et al. ............... 711/134 |
| 6,959,384 | B1 | * | 10/2005 | Serret-Avila ............... 713/176 |
| 7,080,041 | B2 | * | 7/2006  | Nagel ........................... 705/51 |

OTHER PUBLICATIONS

Gennaro, Rosario et al., "Robust and Efficient Sharing of RSA Functions," 2000, Journal of Cryptology, pp. 273-300.*

* cited by examiner

*Primary Examiner*—Pierre Vital
*Assistant Examiner*—Farhana A Ahmed
(74) *Attorney, Agent, or Firm*—Conley Rose, P.C.

(57) ABSTRACT

A method of protecting an electronic document, the method comprising dividing an original document into data blocks; generating a corresponding hash value for each data block; generating a corresponding hash value for a group of data blocks (GOB); generating a hash tree structure based on the corresponding hash values for the data blocks and for the GOB; calculating a hash value of a root node of the hash tree structure, the root node having no parent in the hash tree structure; signing the hash value of the root node; and generating auxiliary authentication data; wherein said auxiliary authentication data enables authentication of portions of the electronic document based on a reconstruction of the hash tree structure.

15 Claims, 6 Drawing Sheets

METHOD FOR INCREMENTAL AUTHENTICATION OF DOCUMENTS

FIELD OF INVENTION

The present invention relates broadly to a method and system for protecting an electronic document, to a method and system for authenticating an electronic document, to a computer readable data storage medium having stored thereon computer code means for instructing a computer to execute a method of protecting an electronic document, and to a computer readable data storage medium having stored thereon computer code means for instructing a computer to execute a method of authenticating an electronic document divided into a GOB.

BACKGROUND

In third-party publication applications, the document owner produces documents and allows third parties to publish them so that the documents can be widely disseminated. The publishers respond to the requests of the users by sending appropriate data. The requested data arriving at the user may only be a portion of the complete document generated by the owner. There may be two reasons for this. One is that the user requests for only part of the document while the other is that due to the limitation of network bandwidth, access privilege or receiver resource, a proxy transcodes the data sent from the publisher so that different users can have different quality of content. For example, a client (user) may request for half the number of the tiles of an original JPEG2000 image according to JPIP protocol. A proxy may then transmit to the client only the lowest resolution of the code-stream sent from the server on account of the limitation of network bandwidth.

In critical applications, the user may need a proof of authenticity of the content, so as to assure that the content is authentic. These applications may arise in various sectors such as the government, finance, healthcare and law sectors. Therefore, a solution is required for transmitting authentic portions of an authenticated document.

One solution would be ensuring the document owner prepares all possible signatures for all possible answers to users' requests in advance. However, this solution is not scalable and impractical when there are many different users' requests. Another solution would be to provide a designated server that certifies answers to users' requests by digitally signing them with an on-line private key. However, the server and its on-line private key, would be vulnerable to external hacking and insider attacks. The server needs to be trusted, and it needs to maintain an on-line signing key. Thus, both suggested solutions will not be feasible for transmitting authentic portions of an authenticated document. Therefore, some other approaches may also be considered here.

An approach to sign XML documents has been suggested which allows untrusted servers to answer certain types of requests over XML documents without the need for trusted on-line signing keys. XML is a tree-like data structure in nature. It admits a hash procedure which basically hashes the leaves of the document, and recursively proceeds up the document tree, hashing both the element types as well as the elements within the document. If the root hash of an entire document is known to a verifier, it is possible to provide evidence of a sub-tree to the verifier when the hash values of its siblings and the siblings of all its parents are available. The proposed signature approach allows the use of a single signature over an entire document to authenticate any given part of that document by introducing an auxiliary structure. However, the author does not disclose any treatment regarding documents whose data structures are represented with multiple trees.

On the other hand, U.S. Pat. No. 5,694,569 permits the hash of a file to be taken on an incremental basis. It permits any part of the file to be changed while allowing a new aggregate hash to be computed based on the revised file portion and the prior hash. With a commutative, invertible and associative function such as exclusive OR and arithmetic addition, the aggregate hash is readily updated with each record revision without re-computing the hash of the entire file. All such record hashes are added together. It was believed that the aggregate hash covers the entire database such that the tampering of any data record is revealed. Unfortunately, this incremental hash scheme was broken recently.

On a similar note, U.S. Pat. No. 5,898,779 discloses a digital camera having embedded therein a unique private key. Within the image captured with the designated camera, at least one region of interest (ROI) suitable for authentication can be identified. A signature can be generated on the hash value of the ROI. The image data, the digital signature, and the location data of said ROI are stored in a digital record. A known public key corresponding to the private key is used to check the signature to establish authenticity of the ROI. However, a problem arises since the ROI cannot be varied or changed once the digital signature is generated.

Hence, it is with the knowledge of the above concerns and restrictions that the present invention has been made.

SUMMARY

In accordance with a first aspect of the present invention there is provided a method of protecting an electronic document, the method comprising dividing an original document into data blocks; generating a corresponding hash value for each data block; generating a corresponding hash value for a group of data blocks (GOB); generating a hash tree structure based on the corresponding hash values for the data blocks and for the GOB; calculating a hash value of a root node of the hash tree structure, the root node having no parent in the hash tree structure; signing the hash value of the root node; and generating auxiliary authentication data; wherein said auxiliary authentication data enables authentication of portions of the electronic document based on a reconstruction of the hash tree structure.

The method may comprise dividing each data block into segments; generating a corresponding incremental hash value for each segment of each data block; wherein the generating of the hash tree structure is further based on the corresponding incremental hash values.

The method may comprise assigning the hash value of each segment of each data block to a leaf node of the hash tree structure; generating a value for a non-leaf node of the hash tree structure based on a compositional value of child nodes of said non-leaf node; wherein the generating of the hash value for each data block is based on the value of a root node of a sub-tree of the hash tree structure having no parent in said sub-tree structure.

The method may comprise assigning the hash value of each data block to a leaf node of the hash tree structure; and generating a value for a non-leaf node of the hash tree structure based on a compositional value of child nodes of said non-leaf node.

Each leaf in the hash tree structure may have a given priority within the hash tree structure, and the method comprises identifying portions of the electronic document corresponding to one or more leaves of the hash tree structure; identifying the leaf node out of said one or more leaf nodes with the lowest priority in the hash tree structure; generating a value for a sibling non-leaf node of said leaf node with the lowest priority based on a compositional value of child nodes of said non-leaf node; wherein the generating of auxiliary authentication data is based on the value for said sibling non-leaf node.

The method may comprise identifying portions of the electronic document corresponding to one or more leaves of the hash tree structure; identifying a remainder of the hash tree structure; wherein the generating of auxiliary authentication data is based on obtaining hash value information of the remainder of the hash tree structure through an incremental and commutative hash function.

The incremental and commutative hash function may be constructed by selecting two large primes p and q; denoting N=pq. A finite field $Z^*_N = \{x | \gcd(x,N)=1, 1<x<N\}$, where gcd() is greatest common divisor; selecting an element $\alpha$ in field $Z^*_N$ and wherein the hash value of the GOB is $\alpha$ to the exponent of multiplicity of hash value $V_i$ for each block in field $Z^*_N$.

Generating the hash value of the GOB may comprise incorporating document identification information.

The signing of the hash value of the root node of the hash tree structure may comprise utilising RSA or DSS.

In accordance with a second aspect of the present invention there is provided a method of authenticating an electronic document divided into a group of data blocks (GOB), the method comprising receiving a signature based on a hash value of a root node of an original hash tree structure representation of content of an original document, the root node having no parent in the original hash tree structure; receiving auxiliary authentication data; generating a corresponding hash value for each received data block; generating a corresponding hash value for the received GOB; reconstructing an authentication hash tree structure based on the corresponding hash values for the received data blocks and for the received GOB, and based on the received auxiliary authentication data; and authenticating a hash value of a root node of the authentication hash tree structure with said received signature.

In accordance with a third aspect of the present invention there is provided a system for protecting an electronic document, the system comprising a dividing means for dividing an original document into data blocks; a hash value generating means for generating a corresponding hash value for each data block; and for generating a corresponding hash value for a group of data blocks (GOB); a hash tree structure generating means for generating a hash tree structure based on the corresponding hash values for the data blocks and for the GOB; a processor means for calculating a hash value of a root node of the hash tree structure, the root node having no parent in the hash tree structure; a signing means for signing the hash value of the root node; and wherein the processor means further generates auxiliary authentication data, wherein said auxiliary authentication data enables authentication of portions of the electronic document based on a reconstruction of the hash tree structure.

In accordance with a fourth aspect of the present invention there is provided a system for authenticating an electronic document divided into a group of data blocks (GOB), the system comprising a receiving means for receiving a signature based on a hash value of a root node of an original hash tree structure representation of content of an original document, the root node having no parent in the original hash tree structure and for receiving auxiliary authentication data; a hash value generating means generating a corresponding hash value for each received data block and for generating a corresponding hash value for the received GOB; a hash tree structure generating means for reconstructing an authentication hash tree structure based on the corresponding hash values for the received data blocks and for the received GOB, and based on the received auxiliary authentication data; and a processor means for authenticating a hash value of a root node of the authentication hash tree structure with said received signature.

In accordance with a fifth aspect of the present invention there is provided a computer readable data storage medium having stored thereon computer code means for instructing a computer to execute a method of protecting an electronic document, the method comprising dividing an original document into data blocks; generating a corresponding hash value for each data block; generating a corresponding hash value for a group of data blocks (GOB); generating a hash tree structure based on the corresponding hash values for the data blocks and for the GOB; calculating a hash value of a root node of the hash tree structure, the root node having no parent in the hash tree structure; signing the hash value of the root node; and generating auxiliary authentication data; wherein said auxiliary authentication data enables authentication of portions of the electronic document based on a reconstruction of the hash tree structure.

In accordance with a sixth aspect of the present invention there is provided a computer readable data storage medium having stored thereon computer code means for instructing a computer to execute a method of authenticating an electronic document divided into a group of data blocks (GOB), the method comprising receiving a signature based on a hash value of a root node of an original hash tree structure representation of content of an original document, the root node having no parent in the original hash tree structure; receiving auxiliary authentication data; generating a corresponding hash value for each received data block; generating a corresponding hash value for the received GOB; reconstructing an authentication hash tree structure based on the corresponding hash values for the received data blocks and for the received GOB, and based on the received auxiliary authentication data; and authenticating a hash value of a root node of the authentication hash tree structure with said received signature.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

The example embodiments described can provide a method to authenticate a document or portions of a document with a single signature or few signatures.

Figure 1:
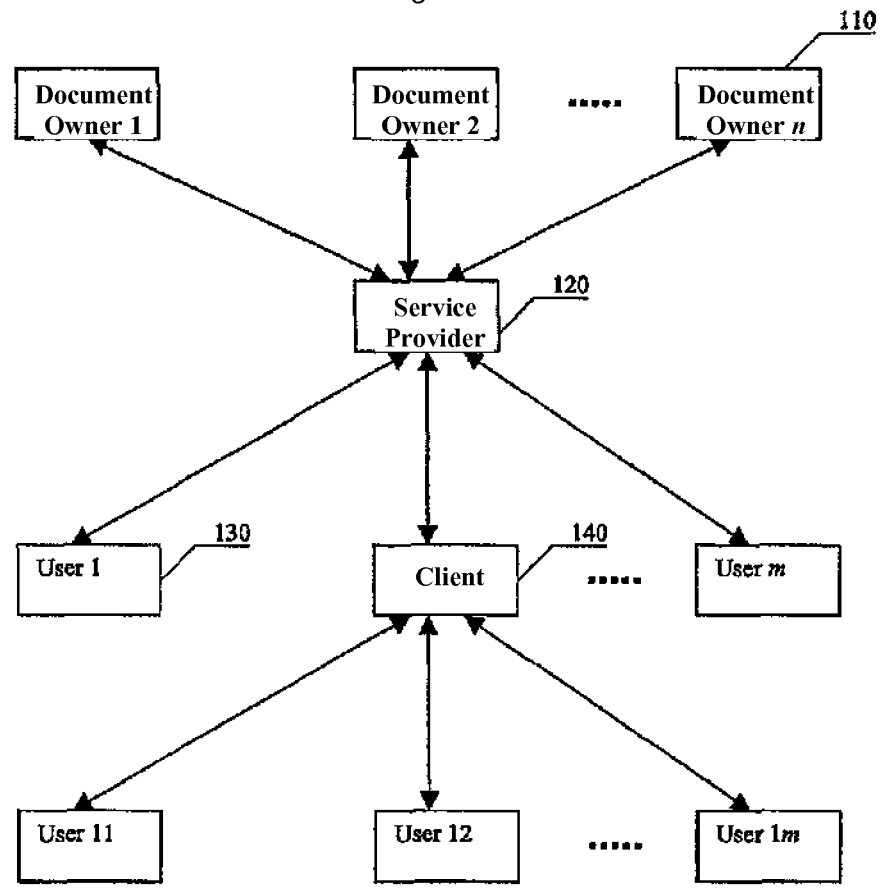
FIG. 1 is a flow diagram illustrating the communication processes between content owners and users.

In an example embodiment, a document owner (110) in FIG. 1 may generate a hash value for each possible access cell and the signatures on their combinations in advance. Here an access cell can be a minimal unit from the viewpoint of the document owner. For instance, the access cell can be the intensity component of a colour image which is accessed with a high possibility. The hash of the combination of the access cells is obtained with an incremental hash function, and/or with commutative hash functions. The document and all the signatures on the combination of access cells are stored in the database of the service provider (120) in FIG. 1. In FIG. 1, if a user (130) or a user through a client (140) asks for some access cells, the service provider (120) transmits to the user (130) or client (140) the combinations covering the required cells, some auxiliary authentication information (AAI), and the corresponding signatures. The user (130) can then verify each combination based on its signature and AAI with the public key of the document owner (110).

In a second example embodiment, a document owner (110) in FIG. 1 generates a unique signature for the whole document even though there will be many different user (130) requests. The hash value being signed is produced with an incremental hash algorithm. The service provider (120) then transmits the required content as well as the document signature and AAI to the user (130) or client (140).

Figure 2:
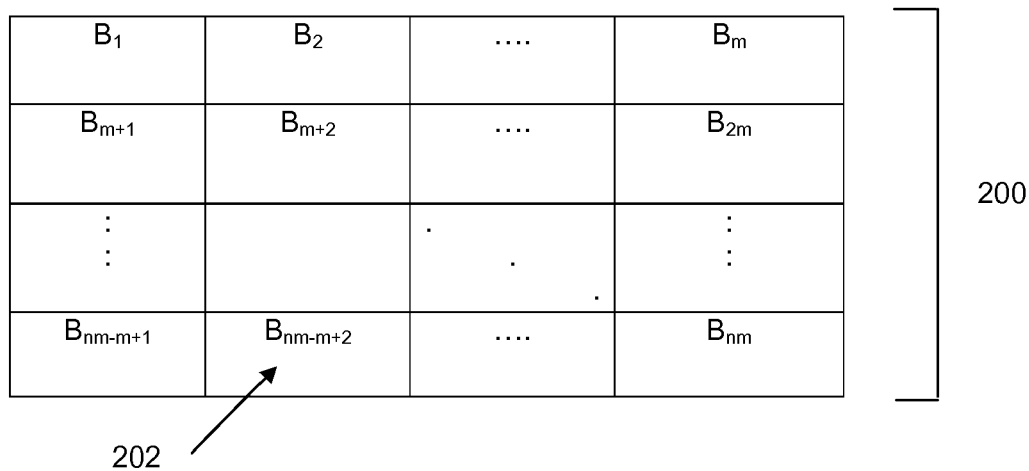
FIG. 2 is an illustration of a document being broken down into blocks in an example embodiment.

In a third example embodiment, a document (200) is divided into blocks (202) which may be independent units as shown in FIG. 2. The blocks (202) may be assigned into different groups. The signature on the hash value of a group of blocks (GOB) may be produced with two steps. The first step is to generate the hash value of each block with an incremental hash algorithm. The second step is to generate the hash value of GOB based on a commutative and incremental hash algorithm with the block hash values. The owner calculates the hash of each GOB as the first example embodiment above does, and calculates the hash for each block as the second example embodiment above does. The publisher provides the signatures and AAI besides the requested content.

Of the above 3 example embodiments, the first and second embodiments described are special cases of the third described embodiment. That is, if a block is an access cell, the third embodiment described above is reduced to the first example embodiment. On the other hand, if a block is the whole document, the third embodiment described above is reduced to the second example embodiment.

Consequently, the third example embodiment above is further elaborated in the following paragraphs.

In an example embodiment, the content owner (110) as seen in FIG. 1, the unique entity who can generate the signature of the document, divides the document (200) in FIG. 2 into blocks (202). The data structure of each block (202) in FIG. 2 is represented as a hash tree (300) shown in FIG. 3. Generally, each leaf, for example segment (340) of said hash tree may be a second hash tree recursively. In addition to the preparation of the document, the document owner (1 10) produces one signature for each Group of Blocks (GOB). The definition of GOB depends on application, network resource, and preference of users. It may include the whole document (200) or only one block (202) as seen in FIG. 2. The GOB, as well as its signature, is transmitted to the publisher (120) as seen in FIG. 1. The publisher (120) in FIG. 1 stores the document and its signatures together. In FIG. 1, when a user (130) requests for a document with some parameters such as offset and size, the publisher (120) provides the user (130) with a customized document together with signatures and AAI, which yield a proof of the answer. That is, the AAI can be used to verify whether the customised document is authentic. In some instances, the AAI may come from the proxy (140) as seen in FIG. 1. The user (130) then verifies the proof by relying solely on its trust in the document owner (110) and public information about the owner (110).

Therefore, in this example embodiment, there are 3 procedures: signature generation at the owner (110) side as seen in FIG. 1; the AAI generation at the provider (120) or proxy (140) side; and verification at the user (130) side. In this example embodiment, the user (130) requests for the blocks (202) sequentially other than randomly. Another example embodiment shall be described later for instances where the user (130) requests for the blocks (202) in a random sequence.

Signature Generation

As mentioned previously, in this embodiment, the document owner (110) in FIG. 1 divides the document (200) in FIG. 2 into nxm blocks (202), denoting $B_1, B_2, \ldots, B_t$, t=nm as shown . Each block is an ordered data structure, and can also be represented with a hierarchy tree. The signature on a GOB is generated in 3 steps. The first step is to calculate the hash for each block (202). The second step is to calculate the hash for that GOB. The last step is to sign on the hash value of the GOB.

Digest for One Block

Figure 3:
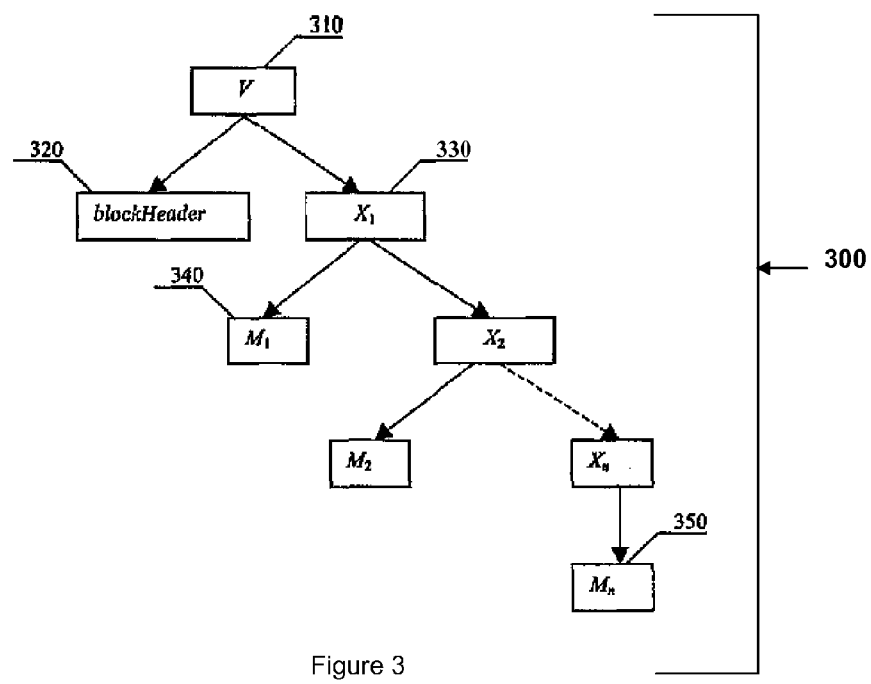
FIG. 3 is an illustration for a single block hash tree in an example embodiment.

In this example embodiment, FIG. 3 illustrates the hash tree (300) for a block (202) in FIG. 2 and its supplementary data (e.g., position and size) such as block header (320). To introduce the construction process of the hash tree (300) in FIG. 3, it is supposed that a block $B_j$, consists of n segments whose hash values are $M_1, M_2, \ldots, M_n$ (340). In this embodiment, for the sake of simplicity, we slightly abuse the notation of the hash value of a segment for the segment itself. In the hash tree (300), the values of leaf nodes are the hash of the segments (340), and the values of non-leaf nodes are the hash values generated from their child nodes.

In this example embodiment, each segment has a priority. The segment with lower priority must follow all the segments with higher priorities. In other words, if segment $M_r$ occurs in the required content, all the $M_1, M_2, \ldots, M_{r-1}$ must be in the content data too. To construct a hash tree, an initial value $X_n = H_1(M_n)$ for the segment $M_n$ (350) with the lowest priority is calculated. Sequentially, the hash value for an intermediary node is calculated with the child nodes. In the FIG. 3, a non-leaf node has only two child nodes, one is the segment, and another is a sub-tree. The value for the non-leaf node is $$X_i = H_1(M_i \| X_{i+1}) i = n-1, \ldots, 2, 1$$

Where $H_1(\bullet)$ is a one-way function such as MD5 or SHA-1, and $\|$ refers to concatenation. For example, the hash value for the segment with the highest priority $X_1 = H_1(M_1\|X_2)$ occurs at step 330. A complete block hash $V_j$, e.g. (310), for block $B_j$ is generated at step 310 as $$V_j = H_1(\text{blockHeader}\|X_1)$$

At step 310, the document owner (110) as seen in FIG. 1 should incorporate some information blockHeader (320) including block number or the position of the block into the hash value so as to prevent collage attack which arranges the blocks in another order.

Digest for a GOB

Figure 4:
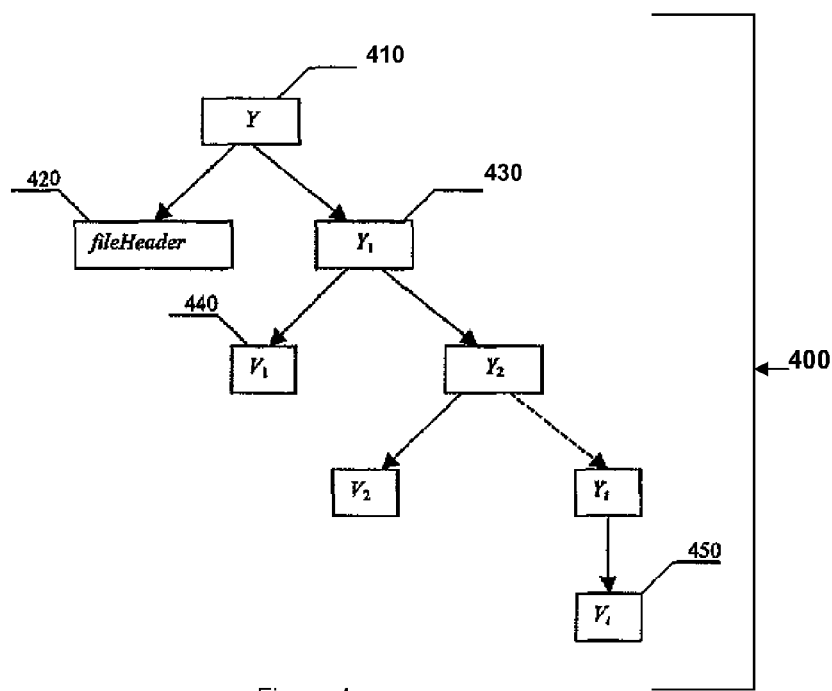
FIG. 4 is an illustration for a Group of Blocks (GOB) hash tree in an example embodiment.

In this example embodiment, with the assumption that the user (130) in FIG. 1 is requesting for blocks (202) of a document (200) in a non-random manner, a hash tree (400) for this kind of application is illustrated in FIG. 4. As seen in FIG. 4, fileheader (420) includes some metadata such as document identification number, the name of owner, etc. Although the hash tree (400) illustrated in FIG. 4 is a binary tree, it can be applied to non-binary trees as well.

The blocks (202), $B_1, B_2, \ldots, B_t$, belonging to the same group or document (200), have hash values obtained as described previously. In the hash tree (400) shown in FIG. 4, the values of leaf nodes (440) are the hashes of the blocks, compare e.g. (310) in FIG. 3, and the values of non-leave nodes (430) are the hash values generated from their child nodes.

To construct the hash tree for a GOB, an initial value $Y_t = H_2(V_t)$ for the last block $B_t$ at step (450) is calculated. Sequentially, the hash value $Y_i$ for an intermediary node is calculated with its child nodes. As seen in FIG. 4, a non-leaf node has only two child nodes, the hash value for the non-leaf node is $$Y_i = H_2(V_i\|Y_{i+1}) i = t-1, \ldots, 2, 1$$

Where $H_2(\bullet)$ is a one-way function such as MD5 or SHA-1. The hash value for the whole group data at step (430) is $Y_1 = H_2(V_1\|Y_2)$. A complete hash Y at step (410) for the GOB is then generated as $$Y = H_2(\text{fileHeader}\|Y_1)$$

Here, the document owner (110) in FIG. 1 should incorporate some information (e.g, the document identification number) into the hash value so as to prevent collage attack which replaces the GOBs with authenticated GOBs of other documents.

AAI Generation

When a user (130) in FIG. 1 sends a request, he may ask for some blocks in one or more GOBs, and/or some segments in each block other than the complete document/block. In this case, the service provider (120) or the proxy (140) as seen in FIG. 1 should send the requested blocks/segments, as well as the AAI.

AAI for One Block

Obtaining the AAI for one block is almost the same as that in signature generation. A block $B_j$ consists of n segments whose hash values are $M_1, M_2, \ldots, M_n$. If the user (130) requests for the r segments $M_1, M_2, \ldots, M_r$ only, the segments following sequentially, $M_{r+1}, M_{r+2}, \ldots, M_n$ are discarded.

In order to calculate the AAI for one block, an initial value $X_n = H_1(M_n)$ for the segment $M_n$ at step (350) as seen in FIG. 3 with the lowest priority is calculated. Sequentially, the hash value for an intermediary node is calculated with the child nodes. For example, if there are only two child nodes, the hash value for the non-leaf node is $$X_i = H_1(M_i\|X_{i+1}) I = n-1, \ldots, r+1$$

Where $H_1(\bullet)$ is a one-way function such as MD5 or SHA-1 and $X_{r+1}$ is the AAI for the manipulated block $B_j$.

AAI for a GOB

In the case where a user (130) requests for a GOB, the AAI generation is similarly described. In the event where only s blocks are requested, the provider (120) or proxy (140) as seen in FIG. 1 sends the first s blocks $B_1, B_2, \ldots, B_s$, of a GOB to the user and discards the subsequent blocks $B_{s+1}, B_{s+2}, \ldots, B_t$.

To generate the proof of authenticity, the provider (120) or proxy (140) as seen in FIG. 1 should supply additional authentication information. To this end, an initial value $Y_t = H_2(V_t)$ for the last $B_t$ is calculated. Sequentially, the hash value for an intermediary node is calculated with the child nodes. As seen in FIG. 4, there are only two child nodes, the hash value for a non-leaf node in the GOB hash tree is $$Y_i = H_2(V_i\|Y_{i+1}) i = t-1, \ldots, s+1$$

Where $H_2(\bullet)$ is a one-way function such as MD5 or SHA-1 and $Y_{s+1}$ is the AAI for the modified GOB.

It is noted that the owner of the content, e.g. (110) in FIG. 1, may calculate the AAI for some blocks in one or more GOBs, and/or some segments in each block other than the complete document/block, in advance, for provision by the service provider (120) or the proxy (140).

Reconstructing the Digest

The user (130) upon receiving the requested content and generated AAI, will verify the content. The complete AAI includes all the authentication data generated as described previously for each block (202) and GOB. To authenticate the content, the user (130) in FIG. 1 will check the authenticity of the GOBs one by one.

Reconstructing Digest for One Block

In the event where the user (130) requests and receives r segments $M_1, M_2, \ldots, M_r$ of block $B_j$, AAI information $X_{r+1}$ for this block (202) will be received as well. In order to verify the block, the user (130) should recover the hash value for this block (202). To this end, he/she may reconstruct the hash tree up to the root. The process is similar to that as described in the Digest for one block. The difference between these two operations is the initial value. If a non-leaf node has two child nodes, its hash value is $$X_i = H_1(M_i\|X_{i+1}) i = r, \ldots, 2, 1$$

Where $H_1(\bullet)$ is a one-way function such as MD5 or SHA-1. A complete block hash for block $B_j$ is generated as $$V_j = H_1(\text{blockHeader}\|X_1)$$

Therefore, the user can reconstruct the hash value for a block (202), such as seen in FIG. 2, based on a sequence of segments and based on the hash of the remaining sub-tree.

In the event where the user (130) requests and receives the modified GOB including $B_1, B_2, \ldots, B_s$ as well as the AAI information $Y_{s+1}$ for this GOB. Known from the construction of the hash tree, the values of leaf nodes are the hashes of the blocks, and the values of non-leave nodes are the hashes generated from its child nodes. For a non-leaf node with two child nodes as seen in FIG. 4, its hash value is $$Y_i = H_2(V_i\|Y_{i+1}) i = s, \ldots, 2, 1$$

Where $H_2(\bullet)$ is a one-way function such as MD5 or SHA-1. To end up the calculation of the hash of the GOB, some information fileheader (420) and as described earlier in the Digest for a GOB should be employed. A complete hash Y for a GOB is generated as $$Y = H_2(\text{fileHeader} \| Y_1)$$

Verifying the Signature

After re-constructing the hash for the requested GOB, the user (130) can check said hash value against the received signature based on the employed signature scheme (RSA or DSS). If both are matched, the received data may be taken to be genuine, otherwise, the content may be tampered or forged.

In the preceding example embodiment described, the user (130) in FIG. 1 requests for blocks or GOB in a sequential manner. The embodiment describes the production of the hash value for strictly ordered blocks. However, in some complicated content, some blocks may share the same priority. Although FIG. 4 provides a flexible approach for authenticating cropped content, it can be seen that only the last blocks can be discarded. An example would be that it prohibits cropping the first block of a group.

Figure 5:
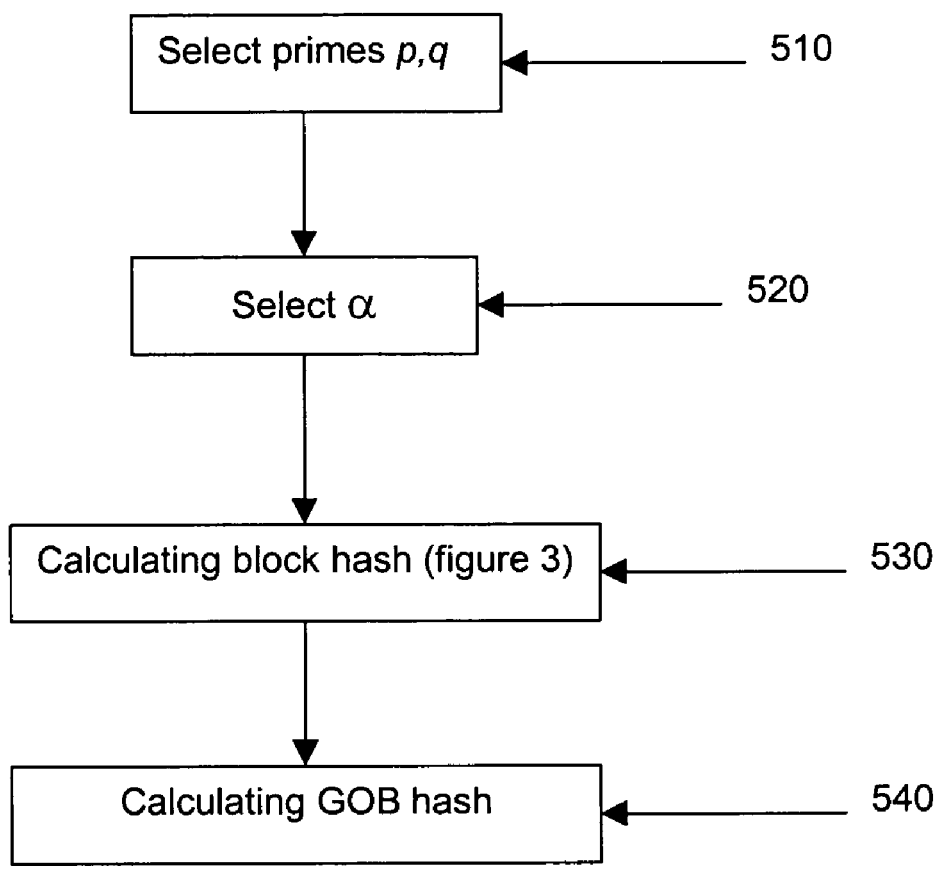
FIG. 5 is a flow diagram illustrating the process of generating the hash value for a GOB in an example embodiment.

Therefore, a fourth example embodiment is provided where the user can gain access to the blocks (202) in FIG. 2 randomly when the incremental hash tree is replaced with a commutative and incremental hash function. This process to generate the hash value is shown in FIG. 5.

Signature Generation

As with the third example embodiment described previously, the procedure of signature generation includes 3 steps. The first step to generate the hash value for each block is the same as that described previously in the Digest for one block. After calculating at step (530) in FIG. 5 all the hash values for the blocks using the hash tree 300 in FIG. 3, the hash value of the GOB can be derived with a commutative and incremental hash function as seen at step (540) in FIG. 5.

This new hash function is based on two assumptions: one is strong RSA Assumption, which means that it is infeasible to find α (520) and x such that $\alpha^x = y$ mod N given y and RSA modulus N. The other is that it is hard to find a message m, such that its hash value H(m) divides a constant C. Benaloh pointed out that the number of the divisors of C should be prohibitively large in order to find a random number divisor with non-negligible probability (Josh Benaloh, and Michael de Mare, "One-Way Accumulators: A Decentralized Alternative To Digital Signatures," Eurocrypto193, Lecture Notes in Computer Sciences 765, pp.274-285,1993).

Given the hash value $V_i$ for each block, the hash value of the GOB is $h = \alpha^b$ mod N, where N at step (510) is a selected RSA modulus, α and N are relatively prime, $b = V_1 V_2 \ldots V_r$.

To speed up the computation, the document owner (110) in FIG. 1 can calculate $\beta = \alpha^N$ mod N and send β to the service provider (120) in advance, thus $$b = V_1 V_2 \ldots V_r - cN, \quad 0 < b < N.$$

then $h = \alpha^b \beta^c$ mod N is the hash of the GOB.

AAI Generation

When a user (130) in FIG. 1 sends a request, he/she may receive some blocks of one or more GOBs, and/or one or more segments of each block (202) in FIG. 2 instead of the complete GOBs. In this case, the service provider (120) or the proxy (140) should send the requested blocks/segments, as well as the AAI for the GOBs and blocks.

The process for calculating the AAI for one block (202) as seen in FIG. 2 is the same as that described previously in generating the AAI for one block in the preceding example embodiment. After obtaining the AAI for one block, the provider (120) or proxy (140) selects parameters including RSA modulus N and α as those in the process of signature generation described in this embodiment. Assume set Ω represents the set of discarded blocks of a GOB. Let $$\beta = \prod_{i \in \Omega} Vi$$

then $\gamma = \alpha^\beta$ mod N is the AAI for that group.

Verification

After receiving the requested content and AAI, the user (130) will verify the content. The complete AAI includes all the AAI generated as described previously in this example embodiment for each block and group. To authenticate the content, the user will check the authenticity of groups one by one.

The process to reconstruct the hash value for one block is the same as that described in the preceding example embodiment. After reconstructing the digest for one block, the user selects the parameters including RSA modulus N and α as those in the process of signature generation as described in this example embodiment. Assume set ψ represents the set of received blocks in the GOB. Let $$\lambda = \prod_{i \in \Psi} Vi,$$

then $h = \gamma^\lambda$ mod N is the reconstructed hash value for that GOB.

Therefore, the user (130) in FIG. 1 can check the reconstructed hash value against the received signature based on the employed signature scheme (RSA or DSS). If both are matched, the content may be taken to be genuine, otherwise, the content may have been tampered or forged.

The described example embodiments can enhance both the security and scalability of publishing information. In addition, the can provide greater extensibility in authenticating parts of document.

Figure 6:
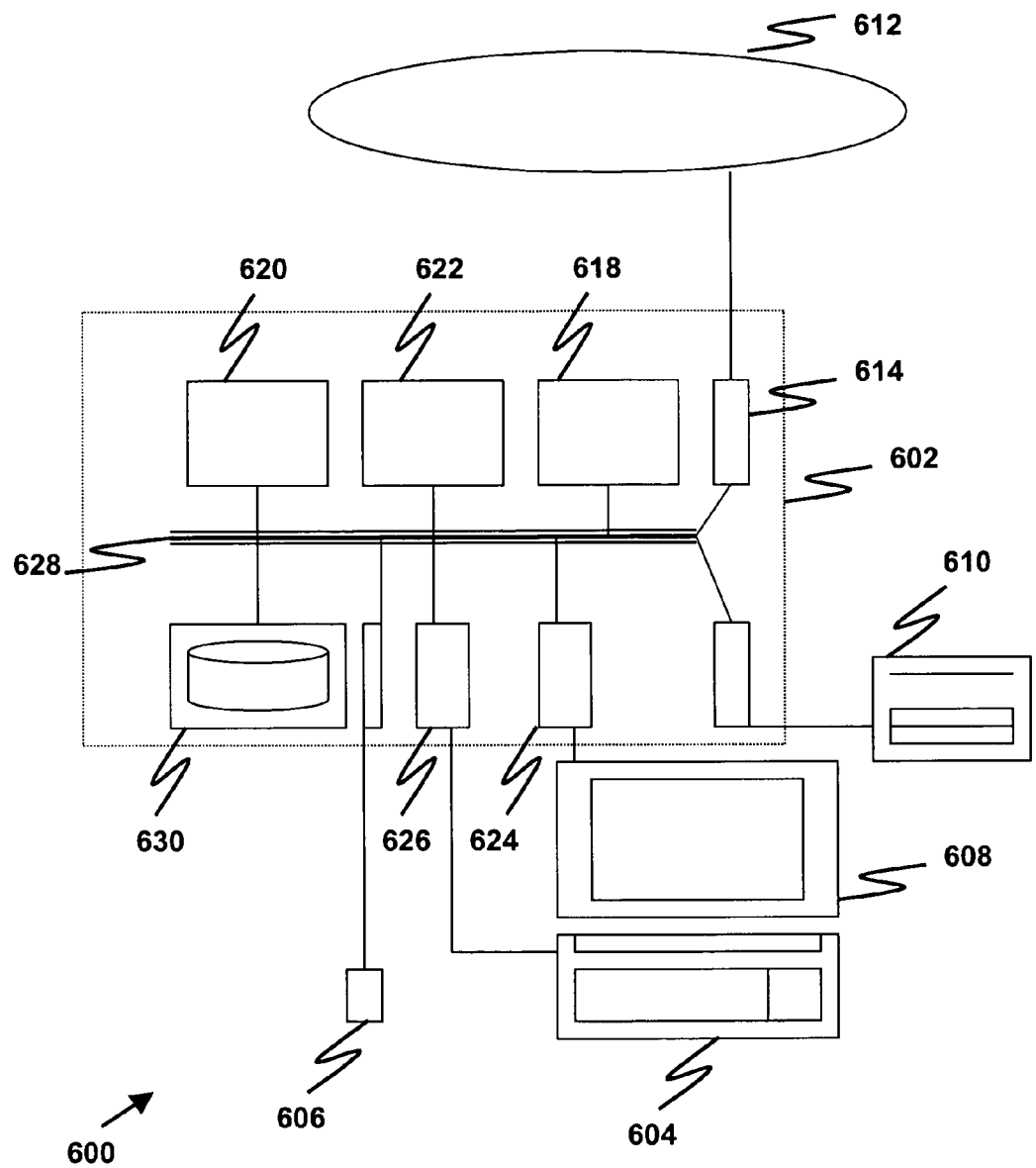
FIG. 6 shows a schematic drawing of a computer system for implementing a method in accordance with an example embodiment.

The method and system of the example embodiment can be implemented on a computer system 600, schematically shown in FIG. 6. It may be implemented as software, such as a computer program being executed within the computer system 600, and instructing the computer system 600 to conduct the method of the example embodiment.

The computer system 600 comprises a computer module 602, input modules such as a keyboard 604 and mouse 606 and a plurality of output devices such as a display 608, and printer 610.

The computer module 602 is connected to a computer network 612 via a suitable transceiver device 614, to enable access to e.g. the Internet or other network systems such as Local Area Network (LAN) or Wide Area Network (WAN).

The computer module 602 in the example includes a processor 618, a Random Access Memory (RAM) 620 and a Read Only Memory (ROM) 622. The computer module 602 also includes a number of Input/Output (I/O) interfaces, for example I/O interface 624 to the display 608, and I/O interface 626 to the keyboard 604.

The components of the computer module 602 typically communicate via an interconnected bus 628 and in a manner known to the person skilled in the relevant art.

The application program is typically supplied to the user of the computer system 600 encoded on a data storage medium such as a CD-ROM or floppy disk and read utilising a corresponding data storage medium drive of a data storage device 630. The application program is read and controlled in its execution by the processor 618. Intermediate storage of program data maybe accomplished using RAM 620.

Figure 7:
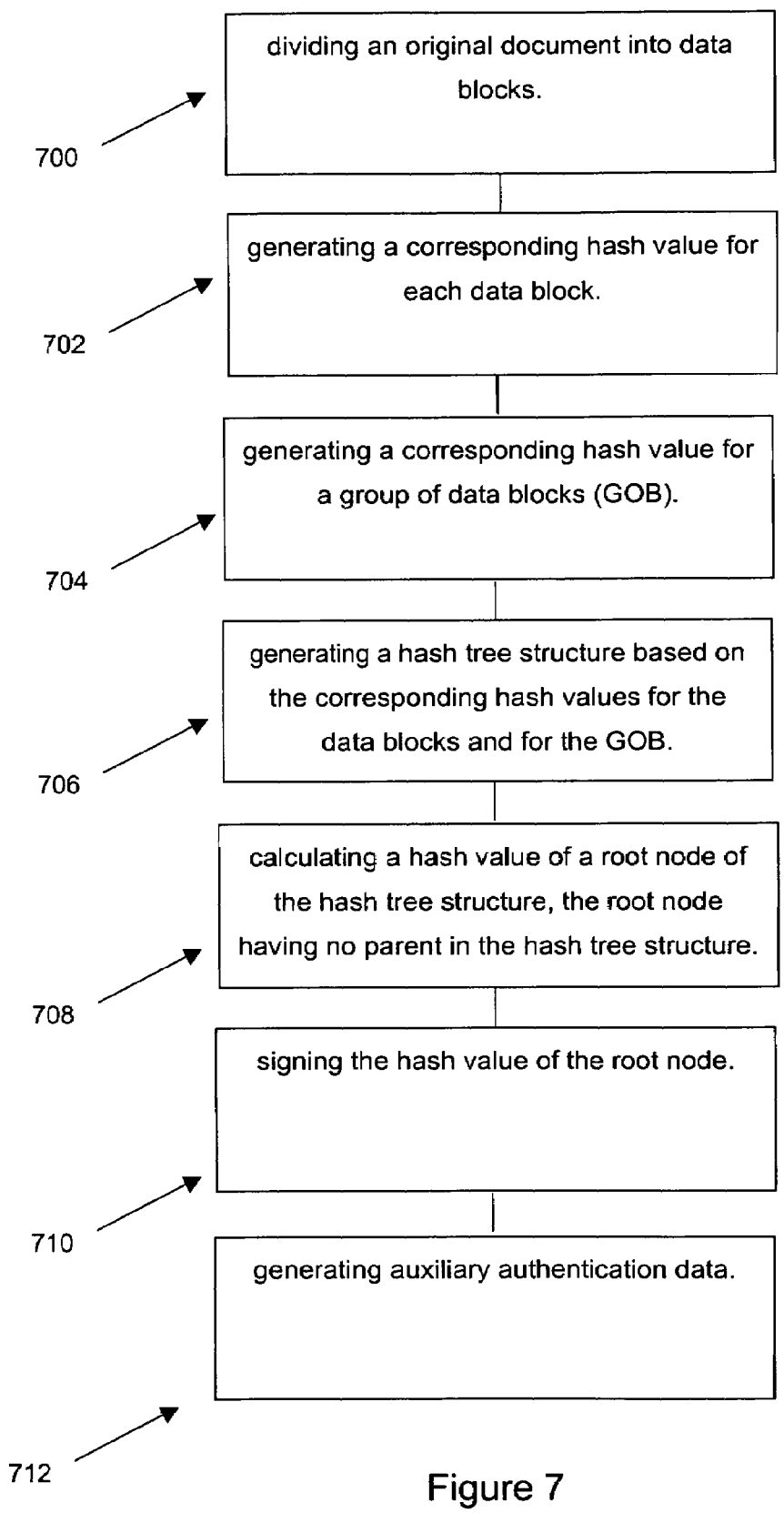
FIG. 7 shows a flowchart illustrating a method of protecting an electronic document in an example embodiment

FIG. 7 shows a flowchart illustrating a method of protecting an electronic document in an example embodiment. At step 700, an original document is divided into data blocks, and at step 702, a corresponding hash value is generated for each data block. At step 704, a corresponding hash value is generated for a group of data blocks (GOB), and at step 706, a hash tree structure is generated based on the corresponding hash values for the data blocks and for the GOB. At step 708, a hash value of a root node of the hash tree structure is calculated, the root node having no parent in the hash tree structure. At step 710, the hash value of the root node is signed; and at step 712, auxiliary authentication data is generated; wherein said auxiliary authentication data enables authentication of portions of the electronic document based on a reconstruction of the hash tree structure.

Figure 8:
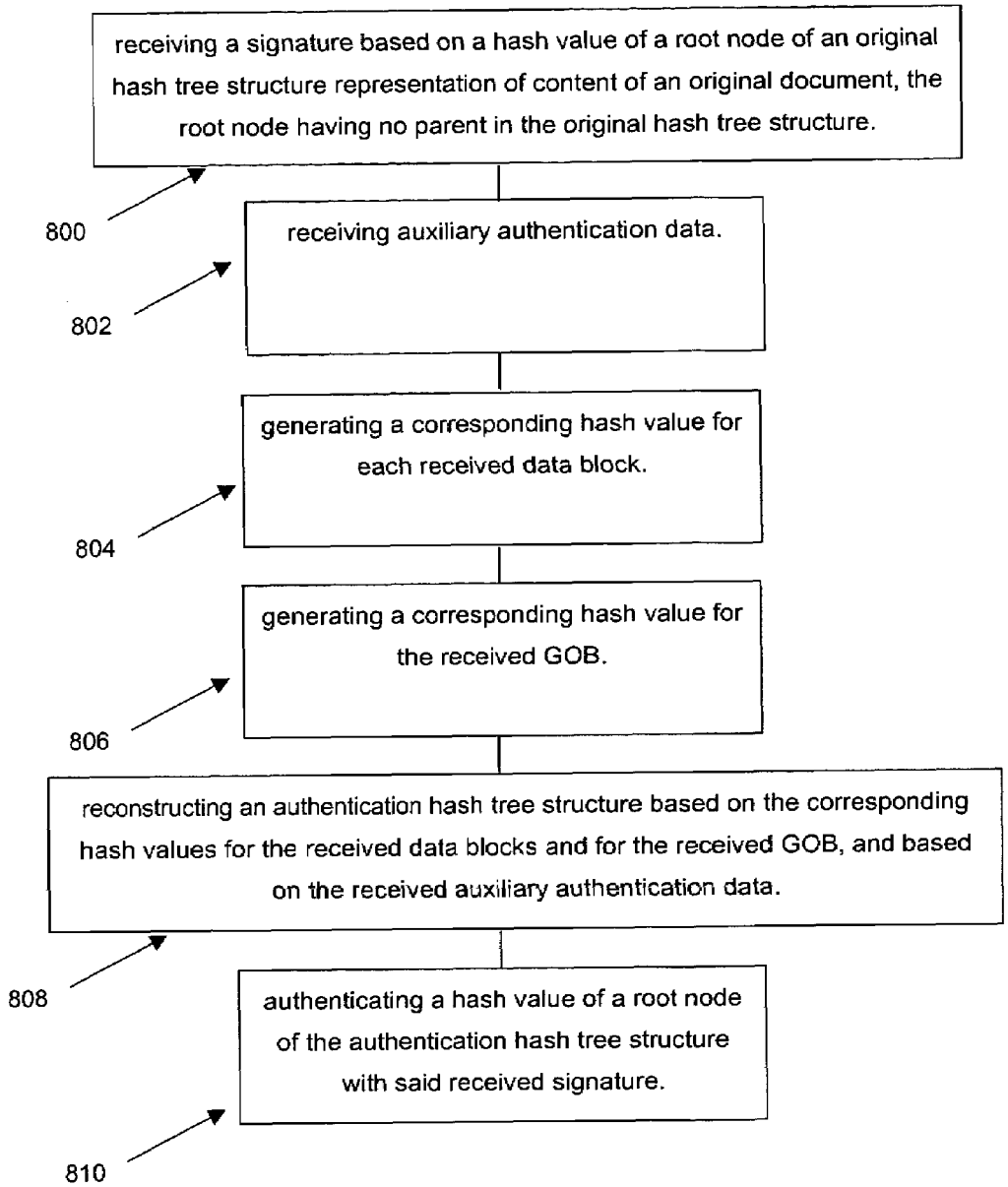
FIG. 8 shows a flowchart illustrating a method of authenticating an electronic document divided into a group of data blocks (GOB) in an example embodiment.

FIG. 8 shows a flowchart illustrating a method of authenticating an electronic document divided into a group of data blocks (GOB) in an example embodiment. At step 800, a signature based on a hash value of a root node of an original hash tree structure representation of content of an original document is received, the root node having no parent in the original hash tree structure. At step 802, auxiliary authentication data is received, and at step 804; a corresponding hash value is generated for each received data block. At step 806, a corresponding hash value is generated for the received GOB, and at step 808, an authentication hash tree structure is reconstructed based on the corresponding hash values for the received data blocks and for the received GOB, and based on the received auxiliary authentication data. At step 810, a hash value of a root node of the authentication hash tree structure is authenticated with said received signature.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

For example, while in the described embodiments documents are authenticated with digital signature, those skilled in the art can extend the concept to authentication of code readily. In such an embodiment, the code would take the place of the document in the described embodiments. As will be appreciated by the person skilled in the art, in such embodiments, for example the external function library should be considered when the codes are segmented based on the functionalities.

The invention claimed is:

1. A method of protecting an electronic document, the method comprising:

dividing an original document into one or more data blocks, each data block comprising one or more segments $M_1$ to $M_n$;

grouping the one or more data blocks into one or more groups of blocks (GOB), each GOB comprising one or more data blocks $B_1$ to $B_t$;

generating a corresponding hash value for each segment of each data block using a first incremental hash algorithm applied to the segments $M_1$ to $M_n$ of said each data block;

generating a corresponding hash value for each data block of each GOB using a second commutative and incremental hash algorithm applied to the blocks $B_1$ to $B_t$ of said each GOB;

generating a hash tree structure based on the corresponding hash values for the segments and the data blocks for each GOB;

signing the hash value of a root node of each hash tree structure; and generating auxiliary authentication data;

wherein said step of generating the auxiliary authentication data comprises identifying one or more selected blocks of one or more GOBs;

identifying one or more selected segments for each selected block the selected segments being in a prioritized order such that if segment $M_r$ is a selected segment, then segments $M_1$ to $M_{r-1}$ having a lower priority are also selected segments;

wherein said auxiliary authentication data comprises an auxiliary hash value generated using said first incremental hash algorithm for segment $M_{r+1}$ for each selected block for which r<n, and an auxiliary hash value generated using said second commutative and incremental hash algorithm for each selected GOB for which less than all blocks have been identified as selected blocks.

2. The method as claimed in claim 1, wherein said second commutative and incremental hash algorithm is constructed by selecting two large primes p and q;

denoting N=pq and denoting a finite field $Z^*N=\{x|gcd(x,N)=1, 1<x<N\}$, where the gcd() is greatest common divisor;

selecting an element in the field $Z^*_N$ and wherein the hash value of the GOB is $\alpha$ to the exponent of multiplicity of has value $V_i$ for each block in field $Z^*_N$.

3. A method of protecting an electronic document, the method comprising:

dividing an original document into one or more data blocks, each data block comprising one or more segments $M_1$ to $M_n$;

grouping the one or more data blocks into one or more data blocks into one or more groups of blocks (GOB), each GOB comprising one or more data blocks $B_1$ to $B_t$;

generating a corresponding hash value for each of the segments of each data block using a first incremental hash algorithm applied to the segments $M_1$ to $M_2$ of said each data block;

generating a corresponding hash value for each data block of each GOB using a second incremental hash algorithm applied to the blocks $B_1$ to $B_t$ of said each GOB;

generating a hash tree structure based on the corresponding hash values for the segments and the data blocks for each GOB;

signing the hash value of a root node of each hash tree structure; and generating auxiliary authentication data;

wherein said step of generating the auxiliary authentication data comprises identifying one or more selected blocks of one or more GOBs, the selected blocks being in prioritized order such that if block $B_s$ is a selected block for one GOB, then data blocks $B_1$ to $B_{s-1}$ of said one GOB and having a lower priority are also selected blocks;

identifying one or more selected segments for each selected block, the selected segments being in a prioritized order such that if segment $M_r$ is a selected segment, then segments $M_1$ to $M_{r-1}$ having a lower priority are also selected segments for said each selected block;

wherein said auxiliary authentication data comprises an auxiliary hash value generated using said first incremental hash algorithm for segment $M_{r+1}$ for each selected block for which r<n, and an auxiliary hash value generated using said second incremental hash algorithm for data block $B_{s+1}$ for each GOB for which s<t.

4. The method as claimed in claims 3 or 1, further comprising calculating a hash value of the a root node of the hash tree structure of each GOB, said calculating comprising incorporating document identification information.

5. The method as claimed in claims 3 or 1, wherein the signing of the hash value of the root node of the hash tree structure of each GOB comprises utilizing RSA or DSS.

6. A method of authenticating a portion of an original document, the original document divided into one or more data blocks, each data block comprising one or more segments $M_1$ to $M_n$, and one or more groups of blocks (GOB), each GOB comprising one or more data blocks $B_1$ to $B_t$, the method comprising the steps of:

receiving one or more selected blocks and respective corresponding hash values of one or more selected GOBs;

receiving one or more selected segments and respective corresponding hash values for each selected block, the selected segments being in a prioritised order such that if segment $M_r$ is a selected segment, then segments $M_1$ to $M_{r-1}$ having a lower priority are also selected segments for said each selected block;

receiving a signature of a hash value of a root node of an original hash tree structure representing each of the selected GOBs;

receiving auxiliary authentication data, said auxiliary authentication data comprising an auxiliary hash value for segment $M_{r+1}$ for each selected block for which r<n, and an auxiliary hash value generated using a commutative and incremental hash algorithm for each selected GOB for which less than all blocks have been received as selected blocks;

reconstructing an authentication hash tree for each of the selected GOBs based on the respective corresponding hash values of the received selected data blocks and the selected segments, and based on the auxiliary authentication data; and authenticating a hash value of the root node of the authentication hash tree for each GOB against the respective received signed signatures using a public key.

7. A method of authenticating a portion of an original document, the original document divided into one or more data blocks, each data block comprising one or more segments $M_1$ to $M_n$, and one or more groups of blocks (GOB), each GOB comprising one or more data blocks $B_1$ to $B_t$, the method comprising the steps of:

receiving one or more selected blocks and respective corresponding hash values of one or more selected GOBs, the selected blocks being in a prioritised order such that if block $B_s$ is a selected block for one GOB, then data blocks $B_1$ to $B_{s-1}$ of said one GOB and having a lower priority are also selected blocks;

receiving one or more selected segments and respective corresponding hash values for each selected block, the selected segments being in a prioritised order such that if segment $M_r$ is a selected segment, then segments $M_1$ to $M_{r-1}$ having a lower priority are also selected segments for said each selected block;

receiving a signature of a hash value of a root node of an original hash tree structure representing each of the selected GOBs;

receiving auxiliary authentication data, said auxiliary authentication data comprising an auxiliary hash value for segment $M_{r+1}$ for each selected block for which r<n, and an auxiliary hash value for data block $B_{s+1}$ for each selected GOB for which s<t;

reconstructing an authentication hash tree for each of the selected GOBs based on the respective corresponding hash values of the received selected data blocks and the selected segments, and based on the auxiliary authentication data; and authenticating a hash value of the root node of the authentication hash tree for each GOB against the respective received signed signatures using a public key.

8. A system for protecting an electronic document, the system comprising:

means for dividing an original document into one or more data blocks, each data block comprising one or more segments $M_1$ to $M_n$;

means for grouping the one or more data blocks into one or more groups of blocks (GOB), each GOB comprising one or more data blocks $B_1$ to $B_t$;

means for generating a corresponding hash value for each segment of each data block using a first incremental hash algorithm applied to the segments $M_1$ to $M_n$ of said each data block;

means for generating a corresponding hash value for each data block of each GOB using a second commutative and incremental hash algorithm applied to the blocks $B_1$ to $B_t$ of said each GOB;

means for generating a hash tree structure based on the corresponding hash values for the segments and the data blocks for each GOB;

means for signing the hash value of a root node of each hash tree structure; and means for generating auxiliary authentication data;

wherein said means for generating the auxiliary authentication data identifies one or more selected blocks of one or more GOBs;

identifies one ore more selected segments for each selected block, the selected segments being in a prioritised order such that if segment $M_r$ is a selected segment, then segments $M_1$ to $M_{r-1}$ having a lower priority are also selected segments;

wherein said auxiliary authentication data comprises an auxiliary hash value generated using said first incremental hash algorithm for segment $M_{r+1}$ for each selected block for which r<n, and an auxiliary hash value generated using said second commutative and incremental hash algorithm for each selected GOB for which less than all blocks have been identified as selected blocks.

9. A system for protecting an electronic document, the system comprising:

means for dividing an original document into one or more data blocks, each data block comprising one or more segments $M_1$ to $M_n$;

means for grouping the one or more data blocks into one or more groups of blocks (GOB), each GOB comprising one or more data blocks $B_1$ to $B_t$;

means for generating a corresponding hash value for each of the segments of each data block using a first incremental hash algorithm applied to the segments $M_1$ to $M_n$ of said each data block;

means for generating a corresponding hash value for each data block of each GOB using a second incremental hash algorithm applied to the blocks $B_1$ to $B_t$ of said each GOB;

means for generating a hash tree structure based on the corresponding hash values for the segments and the data blocks for each GOB;

means for signing the hash value of a root node of each hash tree structure; and means for generating auxiliary authentication data;

wherein said means for generating the auxiliary authentication data identifies one or more selected blocks of one or more GOBs, the selected blocks being in a prioritised order such that if block $B_s$ is a selected block for one GOB, then data blocks $B_1$ to $B_{s-1}$ of said one GOB and having a lower priority are also selected blocks;

identifies one or more selected segments for each selected block, the selected segments being a prioritised order such that if segment $M_r$ is a selected segment, then segments $M_1$ to $M_{r-1}$ having a lower priority are also selected segments for said each selected block;

wherein said auxiliary authentication data comprises an auxiliary hash value generated using said first incremental hash algorithm for segment $M_{r+1}$ for each selected block for which r<n, and an auxiliary hash value generated using said second incremental hash algorithm for data block $B_{s+1}$ for each GOB for which s<t.

10. A system for authenticating a portion of an original document, the original document divided into one or more data blocks, each data block comprising one or more segments $M_1$ to $M_n$, and one or more groups of blocks (GOB), each GOB comprising one or more data blocks $B_1$ to $B_t$, the system comprising:

means for receiving one or more selected blocks and respective corresponding hash values of one or more selected GOBs;

means for receiving one or more selected segments and respective corresponding hash values for each selected block, the selected segments being in a prioritised order such that if segment $M_r$ is a selected segment, then segments $M_1$ to $M_{r-1}$ having a lower priority are also selected segments for said each selected block;

means for receiving a signature of a hash value of a root node of an original hash tree structure representing each of the selected GOBs;

means for receiving auxiliary authentication data, said auxiliary authentication data comprising an auxiliary hash value for segment $M_{r+1}$ for each selected block for which r<n, and an auxiliary hash value generated using a commutative and incremental hash algorithm for each selected GOB for which less than all blocks have been received as selected blocks;

means for reconstructing an authentication hash tree for each of the selected GOBs based on the respective corresponding hash values of the received selected data blocks and the selected segments, and based on the auxiliary authentication data; and means for authenticating a hash value of the root node of the authentication hash tree for each GOB against the respective received signed signatures using a public key.

11. A system for authentication a portion of an original document, the original document divided into one or more data blocks, each data block comprising one or more segments $M_1$ to $M_n$, and one or more groups of blocks (GOB), each GOB comprising one or more data blocks $B_1$ to $B_t$, the system comprising:

means for receiving one ore more selected blocks and respective corresponding hash values of one ore more selected GOBs, the selected blocks being a prioritised order such that if block $B_s$ is a selected block for one GOB, then data blocks $B_1$ to $B_{s-1}$ of said one GOB and having a lower priority are also selected blocks;

means for receiving one ore more selected segments and respective corresponding hash values for each selected block, the selected segments being in a prioritised order such that if segment $M_r$ is a selected segment, then segments $M_1$ to $M_{r-1}$ having a lower priority are also selected segments for said each selected block;

means for receiving a signature of a hash value of a root node of an original hash tree structure representing each of the selected GOBs;

means for receiving auxiliary authentication data, said auxiliary authentication data comprising an auxiliary hash value for segment $M_{r+1}$ for each selected block for which r<n, and an auxiliary hash value for data block $B_{s+1}$ for each selected GOB for which s<t;

means for reconstructing an authentication hash tree for each of the selected GOBs based on the respective corresponding hash values of the received selected data blocks and the selected segments, and based on the auxiliary authentication data; and means for authenticating a hash value of the root node of the authentication hash tree for each GOB against the respective received signed signatures using a public key.

12. A data storage medium having stored thereon computer code means for instructing a computer system to execute a method of protecting an electronic document, the method comprising the steps of:

dividing an original document into one or more data blocks, each data block comprising one ore more segments $M_1$ to $M_n$;

grouping the one or more data blocks into one or more groups of blocks (GOB), each GOB comprising one or more data blocks $B_1$ to $B_t$;

generating a corresponding hash value for each segment of each data block using a first incremental hash algorithm applied to the segments $M_1$ to $M_n$ of said each data block;

generating a corresponding hash value for each data block of each GOB using a second commutative and incremental hash algorithm applied to the blocks $B_1$ to $B_t$ of said each GOB;

generating a hash tree structure based on the corresponding hash values for the segments and the data blocks for each GOB;

signing the hash value of a root node of each hash tree structure; and generating auxiliary authentication data;

wherein said generating the auxiliary authentication data comprises the steps of:

identifying one or more selected blocks of one ore more GOBs;

identifying one or more selected segments for each selected block, the selected segments being in a prioritised order such that if segment $M_r$ is a selected segment, then segments $M_1$ to $M_{r-1}$ having a lower priority are also selected segments;

wherein said auxiliary authentication data comprises an auxiliary hash value generated using said first incremental hash algorithm for segment Mr+1 for each selected block for which r<n, and an auxiliary hash value generated using said commutative and incremental hash algorithm for each selected GOB for which less than all block have been identified as selected blocks.

13. A data storage medium having stored thereon computer code means for instructing a computer system to execute a method of protecting an electronic document, the method comprising the steps of:

dividing an original document into one or more data blocks, each data block comprising one or more segments $M_1$ to $M_n$;

grouping the one or more data blocks into one or more groups of blocks (GOB), each GOB comprising one or more data blocks $B_1$ to $B_t$;

generating a corresponding hash value for each of the segments of each data block using a first incremental hash algorithm applied to the segments $M_1$ to $M_n$ of said each data block generating a corresponding hash value for each data block of each GOB using a second incremental hash algorithm applied to the blocks $B_1$ to $B_t$ of said each GOB;

generating a hash tree structure based on the corresponding hash values for the segments and the data blocks for each GOB;

signing the hash value of a root node of each hash tree structure; and generating auxiliary authentication data;

wherein said generating the auxiliary authentication data comprises the steps of:

identifying one or more selected blocks of one or more GOBs, the selected blocks being in a prioritised order such that if block $B_s$ is a selected block for one GOB, then data blocks $B_1$ to $B_{s-1}$ of said one GOB and having a lower priority are also selected blocks;

identifying one or more selected segments for each selected block, the selected segments being in a prioritised order such that if segment $M_r$ is a selected segment, then segments $M_1$ to $M_{r-1}$ having a lower priority are also selected segments for said each selected block;

wherein said auxiliary authentication data comprises an auxiliary hash value generated using said first incremental hash algorithm for segment $M_{r+1}$ for each selected block for which r<n, and an auxiliary hash value generated using said second incremental hash algorithm for data block $B_{2+1}$ for each GOB for which s<t.

14. A data storage medium having stored thereon computer code means for instructing a computer system to execute a method of authenticating a portion of an original document, the original document divided into one or more data blocks, each data block comprising one or more segments $M_1$ to $M_n$, and one or more groups of blocks (GOB), each GOB comprising one ore more data blocks $B_1$ to $B_t$, the method comprising the steps of:

receiving one or more selected blocks and respective corresponding hash values of one or more selected GOBs;

receiving one or more selected segments and respective corresponding hash values for each selected block, the selected segments being in a prioritised order such that if segment $M_r$ is a selected segment, then segments $M_1$ to $M_{r-1}$ having a lower priority are also selected segments for said each selected block;

receiving a signature of a hash value of a root node of an original hash tree structure representing each of the selected GOBs;

receiving auxiliary authentication data, said auxiliary authentication data comprising an auxiliary hash value for segment Mr+1 for each selected block for which r<n, and an auxiliary hash value generated using a commutative and incremental hash algorithm for each selected GOB for which less than all blocks have been received as selected blocks;

reconstructing an authentication hash tree for each of the selected GOBs based on the respective corresponding hash values of the received selected data blocks and the selected segments, and based on the auxiliary authentication data; and authenticating a hash value of the root node of the authentication hash tree for each GOB against the respective received signed signatures using a public key.

15. A data storage medium having stored thereon computer code means for instructing a computer system to execute a method of authenticating a portion of an original document, the original document divided into one ore more data blocks, each data block comprising one or more segments $M_1$ to $M_n$, and one or more groups of blocks (GOB), each GOB comprising one or more data blocks $B_1$ to $B_t$, the method comprising the steps of:

receiving one or more selected blocks and respective corresponding hash values of one or more selected GOBs, the selected blocks being in a prioritised order such that if block Bs is a selected block for one GOB, then data blocks $B_1$ to $B_{s-1}$ of said one GOB and having a lower priority are also selected blocks;

receiving one or more selected segments and respective corresponding hash values for each selected block, the selected segments being in a prioritised order such that if segment $M_r$ is a selected segment, then segments $M_1$ to $M_{-1}$ having a lower priority are also selected segments for said each selected block;

receiving a signature of a hash value of a root node of an original hash tree structure representing each of the selected GOBs;

receiving auxiliary authentication data, said auxiliary authentication data comprising an auxiliary hash value for segment $M_{r+1}$ for each selected block for which r<n, and an auxiliary hash value for data block $B_{s+1}$ for each selected GOB for whish s<t;

reconstructing an authentication hash tree for each of the selected GOBs based on the respective corresponding hash values of the received selected data blocks and the selected segments, and based on the auxiliary authentication data; and authenticating a hash value of the root node of the authentication hash tree for each GOB against the respective received signed signatures using a public key.

* * * * *